United States Patent [19]
Teng

[11] Patent Number: 5,812,763
[45] Date of Patent: Sep. 22, 1998

[54] EXPERT SYSTEM HAVING A PLURALITY OF SECURITY INSPECTORS FOR DETECTING SECURITY FLAWS IN A COMPUTER SYSTEM

[75] Inventor: Henry Shao-Lin Teng, Groton, Mass.

[73] Assignee: Digital Equipment Corporation, Maynard, Mass.

[21] Appl. No.: 8,066

[22] Filed: Jan. 21, 1993

Related U.S. Application Data

[63] Continuation of Ser. No. 470,992, Jan. 19, 1990, abandoned, which is a continuation of Ser. No. 370,101, Jun. 20, 1989, abandoned, which is a continuation of Ser. No. 157,462, Feb. 17, 1988, abandoned.

[51] Int. Cl.$^6$ ..................................................... G06F 13/00
[52] U.S. Cl. ......................................................... 395/187.01
[58] Field of Search ..................... 364/DIG. 1 MS File, 364/DIG. 2 MS File; 395/200, 325, 425, 575, 600, 650, 700, 800, 186, 187.01; 380/3, 4, 23, 24, 25

[56] References Cited

U.S. PATENT DOCUMENTS

| | | | |
|---|---|---|---|
| 4,672,572 | 6/1987 | Alsberg | 364/900 |
| 4,719,566 | 1/1988 | Kelley | 364/200 |
| 4,725,977 | 2/1988 | Izumi et al. | 364/900 |

OTHER PUBLICATIONS

H.S. Teng, "A Prototype Expert System For Secuity Inspection Of a VAX/VMS System", M.S. Thesis, Computer Science Dept., Worchester Polytechnic Inst. Worchester, MA, Dec. 1986.

Teng, Henry S. "XSAFE: A Prototype Expert System for Security Inspection of a VAX/VMS System in a Network Environment ", A Thesis Submitted to the Faculty of the Worcester Polytechnic Institute, Dec. 1986 Copyright Date.

H,S,Teng, "A Prototype Expert System for Security Inspection of a VAX/VMS System", M.S. Thesis, Computer Science Dept., Worchester Polytechnic Inst. Worchester, MA. Dec. 1986.

*Primary Examiner*—Robert B. Harrell
*Attorney, Agent, or Firm*—Diane C. Drozenski

[57] ABSTRACT

A new security system including a plurality of inspectors each of which performs a security check operation in connection with a particular class of possible security violation conditions. One inspector detects security violation conditions reflecting selection of passwords using easily-guessable formatives. Another inspector detects security violation conditions reflecting ability of a network node to improperly use another node over a network. A third inspector determines whether the operating system files have satisfactory protection. Finally, a fourth inspector determines whether security violation conditions arise in connection with applications programs. If, during a security check operation, an inspector determines that a security violation condition exists, it records the condition in a common working memory for further reporting or analysis.

47 Claims, 13 Drawing Sheets

CAPTIVE ACCOUNT SUB-INSPECTOR

PART 6-1

SECURITY VIOLATION CHECK/VIOLATION FOUND

PREMISE: IF (A) APPLICATION REQUIRES CAPTIVE ACCOUNT
           -AND-
    (B) CAPTIVE ACCOUNT FLAG IN USER AUTHORIZATION FILE IS NOT SET

CONCLUSION: THEN

* SECURITY VIOLATION RECORDED IN COMMON WORKING MEMORY
    - POSSIBLE TO ESCAPE TO OPSYS BY KNOWN KEYSTROKE SEQUENCES

PART 6-2

SECURITY VIOLATION CHECK/EVIDENCE FOUND

PREMISE: IF (A) APPLICATION DISALLOWS BATCH JOBS
           -AND-
    (B) BATCH FLAG IN USER AUTHORIZATION FILE IS SET

CONCLUSION: THEN

* EVIDENCE OF POTENTIAL SECURITY VIOLATION FOUND, RECORDING IN COMMON WORKING MEMORY
    - POSSIBLE TO RUN UNCONTROLLED BATCH JOBS

*Figure 6*

NETWORK COMMUNICATION SUB-INSPECTOR

PART 7-1

DATA TRANSFER INTEGRITY RULE

PREMISE: IF (A) APPLICATION TRANSMIT OR RETRIEVES
    DATA OVER NETWORK
        -AND-
(B) DATA IS SENSITIVE
        -AND-
(C) DATA IS IN PLAIN TEXT
    (I.E., UN ENCRYPTED)

CONCLUSION: THEN

* SECURITY VIOLATION IN COMMON WORKING MEMORY
- DATA CAN BE WIRE TAPPED
        -OR-
- DATA INTEGRITY CAN BE LOST

---

PART 7-2

NETWORK LINK ESTABLISHMENT RULE

PREMISE: IF

ACCESS CONTROL STRING (I.E. USER NAME/PASSWORD)
USED TO ESTABLISH NETWORK LINK

CONCLUSION: THEN

*SECURITY VIOLATION IN COMMON WORKING MEMORY
- ACCESS CONTROL STRING LIKELY TO APPEAR IN
  COMMAND PROTOCOL
    ESTABLISHING LINK OR BE
      INTERCEPTED OVER NETWORK

*Figure 7*

EXECUTABLE IMAGE
SPECIALIST

PREMISE: IF (A) INSTALLED/AUTHORIZED PRIVILEGES
=(PRIV. VAL)

-AND- (B) FUNCTION OF APPLICATION INCLUDE
(FUNC. VAL)

-AND- (C) USER HAS CONTROL OVER FILE/DIRECTORY NAMING

CONCLUSION: THEN

*SECURITY VIOLATION RECORDED IN COMMON WORKING MEMORY

- VIOLATION = (VIOL. VAL)

*Figure 8*

EXPERT SYSTEM HAVING A PLURALITY OF SECURITY INSPECTORS FOR DETECTING SECURITY FLAWS IN A COMPUTER SYSTEM

This application is a continuation of application Ser. No. 07/470,992, filed Jan. 19, 1990 (abandonded) which is a continuation of Ser. No. 07/370,101, filed Jun. 20, 1989, (abandonded) which is a continuation of application Ser. No. 07/157,462, filed Feb. 17, 1988 (abandonded).

CROSS REFERENCE TO RELATED DOCUMENT

H. S. Teng, "XSAFE: A Prototype Expert System For Security Inspection of a VAX/VMS System", M. S. Thesis, Computer Science Department, Worcester Polytechnic Institute, Worcester, Mass., December 1986, incorporated herein by reference.

BACKGROUND OF THE INVENTION

1. Field of the Invention

The invention relates generally to the field of computer systems, and more particularly to systems for monitoring security within a computer system to detect potential security flaws which might enable the computer system to be misused.

2. Description of the Prior Art

Over the past several years, computers have become very important in a number of areas of industrial and governmental operations. Originally, computers were large and expensive devices, operating in relative isolation and programmed and managed by highly trained personnel. As the cost of computer systems decreased, they became directly available to, and used by, people who were not necessarily highly trained in the operation of computers, but instead performed business and technical functions within the organization. Sometimes this has been accomplished by having all users within an organization connect to a single large mainframe computer. Alternatively, systems have been developed involving multiple tightly coupled computer systems or loosely-coupled computer networks to achieve similar results. In many cases, computer systems have been connected to public networks and the public telecommunications system to provide access by remote users.

In any case, providing users with direct access to computer systems has had several effects. One effect has been the requirement that users be able to share access to data and programs within the computer system. Thus, for example, if the computer system performs a bookkeeping and accounting function for a large organization at a number of sites, a number of users at each site may need to access the same data bases at that site. In addition, users at the various sites may need to periodically access data at other sites. To enhance the convenience of the system to the users, usually the facilities to enable the sharing to occur are transparent to the user, that is, they do not require the intervention of a system manager or other highly trained personnel.

As a second effect, and a direct result of the fact that computer systems are being developed which are easily and flexibly used, security within the computer system is an important consideration in system design. First, since a number of users have almost direct access to the system, it is often necessary to ensure that sensitive information which may be maintained on the system, such as personnel, payroll and technical information, is not available to others who may misuse the information. Closely related is the fact that it is often necessary to ensure that users cannot, intentionally or unintentionally, enter or alter which they are not supposed to enter or alter.

Furthermore, since increasing numbers of users are being permitted direct access to the computer system, many of the users are not highly trained in computer system use, but instead may be trained only in the clerical or technical area in which they are working. Thus, it is necessary to protect the computer system from entries by such personnel which may adversely effect computer system operation, such as entries which may result in alterations to operating system programs and data files which may prevent the system from operating properly or permit them to gain access to information to which they should not have access. In addition, it is necessary to limit access to such files by persons who are knowledgeable in the use of the system, who may intentionally alter the system files to permit them to access information to which they should not have access.

Security systems for enhancing a computer system's security have been designed along two paradigms. In one paradigm, the system hardware and, primarily, the operating system which controls computer resources are designed to minimize the likelihood of security breaches. While such systems may be effective, they are expensive to develop and may not have desirable features which may be present on other, less secure, computer systems. In addition, often such systems are vulnerable to misuse and abuse by insiders who misuse their operating privileges.

In the second paradigm, the security system performs an evaluation of the computer system to detect flaws and identify them to an operator for correction. This paradigm assumes that the computer system includes security provisions but that those provisions may be corrupted to create an insecure system.

SUMMARY OF THE INVENTION

The invention provides a new and improved system for detecting security flaws within a digital data processing (computer) system. In particular, the new system detects flaws which may permit the corruption of the computer system, which may, in turn, permit unauthorized use and misuse of the computer system.

In brief summary, the new security system includes a plurality of inspectors each of which performs a security check operation in connection with a particular class of possible security violation conditions. If, during a security check operation, an inspector determines that a security violation condition exists, it records the condition in a common working memory for further reporting or analysis.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 6 is a flow diagram detailing the operations of a captive account sub-inspector.

FIG. 7 is a flow diagram detailing the operations of a network communication sub-inspector.

FIG. 8 is a flow diagram detailing the operations of an executable image specialist.

DETAILED DESCRIPTION OF AN ILLUSTRATIVE EMBODIMENT

1. GENERAL DESCRIPTION

Preliminarily, the invention provides a new security system in the form of a program run on a computer system which detects security flaws in the computer system. The computer system may include a single processor or a plurality of processors which are tightly coupled or loosely coupled over a network, with each processor in a multiple processor computer system being at a node. Each node may also include conventional peripheral equipment, including mass storage units, printers, video display terminals, telecommunications interfaces, and so forth, in addition to interfaces which allow it to communicate with other nodes in the computer system. Typically, if the new security system is used in a computer system having a plurality of nodes, it may be run by an operator at one node, which may then enable other nodes to perform operations, as described below, to perform security check operations to verify security aspects of the node.

Figure 1:
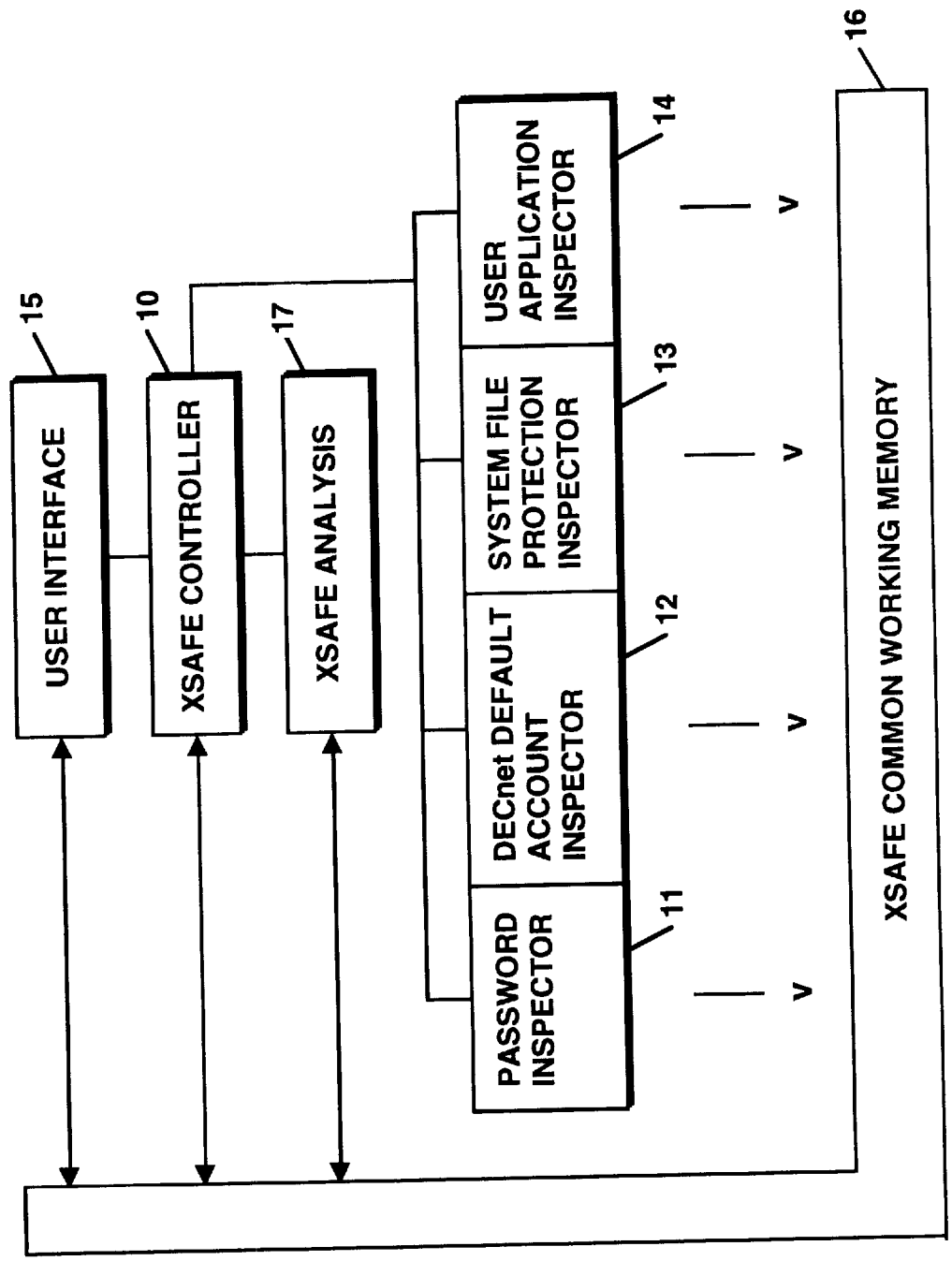
FIG. 1 is a functional block diagram of the new security system.

A functional block diagram of the new security system is depicted in FIG. 1. With reference to FIG. 1, the security system includes a controller 10 which enables a plurality of security inspectors 11 through 14, as detailed below, to perform security operations on various aspects of the computer system in response to operator input information which it receives from an operator interface 15. The controller 10 separately enables each of the various security inspectors 11 through 14 in response to the input information from the operator, and the security inspectors 11 through 14 operate independently of each other in performing their security inspection operations as described below.

In response to enablement from the controller 10 each security inspector 11 through 14, in performing its operations, obtains information regarding the computer system from a common working memory 16 and deposits security information representing the results of its security analysis in the common working memory 16. Following a security operation by one or more of the security inspectors 11 through 14, the controller 10 may enable a security analyzer 17 to analyze the security information in the common working memory 16. The security analyzer 17 couples the results of its analysis to the controller 10 for transmission to the operator interface 15 for presentation to the operator. In performing its security analysis, the security analyzer 17 may use the results of operations by several of the security inspectors 11 through 14 as deposited in the common working memory 16. Thus, for example, the security analyzer 17 may inter-relate the results of security operations obtained by the various security inspectors 11 through 14.

As described above, the security system includes four security inspectors 11 through 14. Each security inspector 11 through 14 performs a different security operation in connection with the computer system. Password inspector 11 detects whether a user who is authorized to use the computer system has selected a password which can be easily guessed. As is conventional, when a user wishes to begin using the computer system, he "logs on", that is, he enters an identification code which identifies him to the computer system. This log on procedure then enables the computer system to permit the user to run the programs and use the data files which are permitted under the account. As part of the user's identification, he provides the system with a password, preferably known only to him, which verifies the identification. The password is usually selected by the user, but often the user selects a password can be easily guessed, because it is a name associated with the user or his birthday, telephone number, and so forth. Another person who is not authorized to use the account may easily guess the password, and thereby gain access to the programs and data files for malicious purposes. The password inspector 11 detects whether a password has been selected which can be easily guessed so that the operator may require selection of a new password.

A network default account inspector 12 is used if the computer system includes a plurality of nodes interconnected by way of, for example, a network. In one specific computer system, the operating system at each node provides a default account which is used by a process, termed an object, to activate the network at that node. The network default account inspector 12 determines whether a user can execute a program or enable a remote node to execute an applications program while in the default account.

In addition, in one specific computer system, the programs which a user may execute are assigned one or several of a plurality of privilege levels, to control the ability of the user to read, process and write files in the system. The network default account inspector 12 verifies the privilege level of the network default account.

In one specific computer system, as is conventional, the operating system maintains a plurality of system files that store data which is used in processing of the operating system. Each file includes a protection code vector which identifies the read, write, execute and delete privileges of different categories of privilege levels. A system file protection inspector 13 performs a series of probe operations in connection with the protection code vector of each system file to find those which have improper protection levels.

As is conventional, users enable the computer system to process applications programs to obtain processed data therefrom. In many cases, the applications programs use data from data files which may be shared with a number of other applications and users and it is desirable to provide control over, most notably, writing data to such shared data files, and also deletion of data as well as an entire file. In addition, if the computer system comprises a plurality of nodes interconnected by a network, a user may, by means of a user application, enable a node on the network to eavesdrop on data transmission over the network, which may enable the user to obtain access to data which he is not authorized to access.

Figure 2:
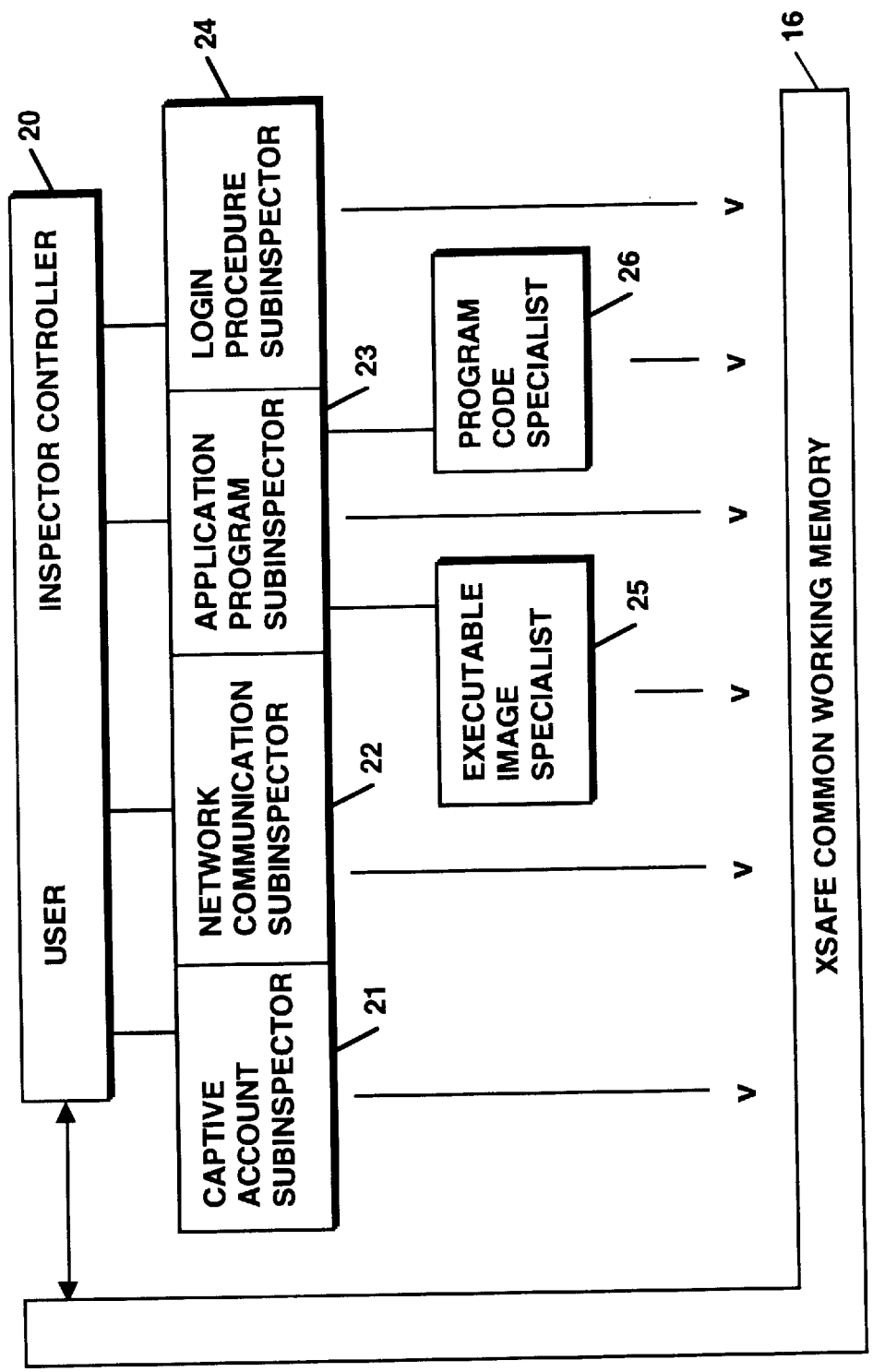
FIG. 2 is a detailed functional diagram of a portion of the security system depicted in FIG. 1.

The security system includes a user application inspector 14 to minimize jeopardy to security in connection with user applications. The user application inspector 14 includes a plurality of components, as depicted in FIG. 2, which perform, under control of a user inspector controller 20, diverse inspection operations in connection with user applications, including a captive account sub-inspector 21, a network communication sub-inspector 22, an application program sub-inspector 23 and a log-in procedure sub-inspector 24. All of the sub-inspectors 21 through 24 are directly connected to the common working memory 16 and can obtain information therefrom and deposit information therein relating to the results of the security inspections.

The application program sub-inspector 23, in turn, controls two specialist inspectors, namely an executable image specialist 25 and a program code specialist 26 which perform security inspections under control of the application program sub-inspector 23. The specialists 25 and 26 are also directly connected to the common working memory 16 and can obtain information therefrom and deposit information therein relating to the results of the security inspections.

In one specific computer system, the operating system maintains a user authorization file to identify, for each applications program, the authorized users of the applications program and the account from which the user may access the applications program. The captive account sub-inspector 21 inspects the information in the user authorization file associated with the applications program to ensure that the account complies with the requirements for the applications.

The network communication sub-inspector 22 identifies possible security problems with a user application which performs communications over a network. For example, the network communication sub-inspector 22 determines whether the user application enables information to be transferred over the network in plain text, that is, unencrypted, which may be intercepted by others monitoring the network for potentially malicious purposes. In addition, the network communication sub-inspector 22 determines whether a user application transfers passwords over the network, which may be intercepted by others and used maliciously.

The log-in procedure sub-inspector 24 determines whether the user may, during log-in, escape to the operating system level, which is used by an operator to control the computer system. During log-in, the user essentially enables the operating system to execute a series of commands in a log-in file. If the commands in the log-in file permit the user to escape to the operating system, he may be able to modify files used by the operating system to control the system, which is undesirable. The presence or absence in the file of pre-determined commands governs whether the user may escape to the operating system level. The log-in procedure sub-inspector 24 parses a log-in file to determine whether commands are present in the file which would enable the user to escape to the operating system level, or whether other commands are absent which would prevent the user from escaping to the operating system level.

The application program sub-inspector 23, through the executable image specialist 25 and program code specialist 26, inspects applications programs to determine whether they permit the user to perform operations which may otherwise abuse his privileges in operations within the computer system. The executable image specialist 25 and program code specialist 26 inspect applications programs at different levels. In particular, the executable image specialist 25 examines the executable image of an applications program to determine whether it can perform certain operations which would permit a user running the applications program to violate the security of the computer system, that is, to access, modify, delete and/or execute operating system files or other sensitive files. The program code specialist 26 performs a similar function in connection with the source code of the applications program.

2. SPECIFIC DESCRIPTION

A. Password Inspector 11

With this background, the sequence of operations performed by the respective security inspectors 11 through 14 will be described in detail in connection with FIGS. 3 through 10B. The password inspector 11 will be described in connection with FIG. 3, which depicts the operations performed by the password inspector 11 in performing its security check operation. As noted above, the password inspector 11 inspects passwords to determine if any of them are constructed of formatives which can be easily guessed as being, for example, associated with the person selecting the password, and thus is undesirable to use in a password. The password inspector 11 is constructed as a procedural system which, for each password to be checked, sequences through the undesirable formatives to determine if the password being checked includes such a formative. If the password inspector 11 detects the presence of an undesirable formative in a password, it makes an entry in the common working memory 16 and notifies an operator.

Figure 3:
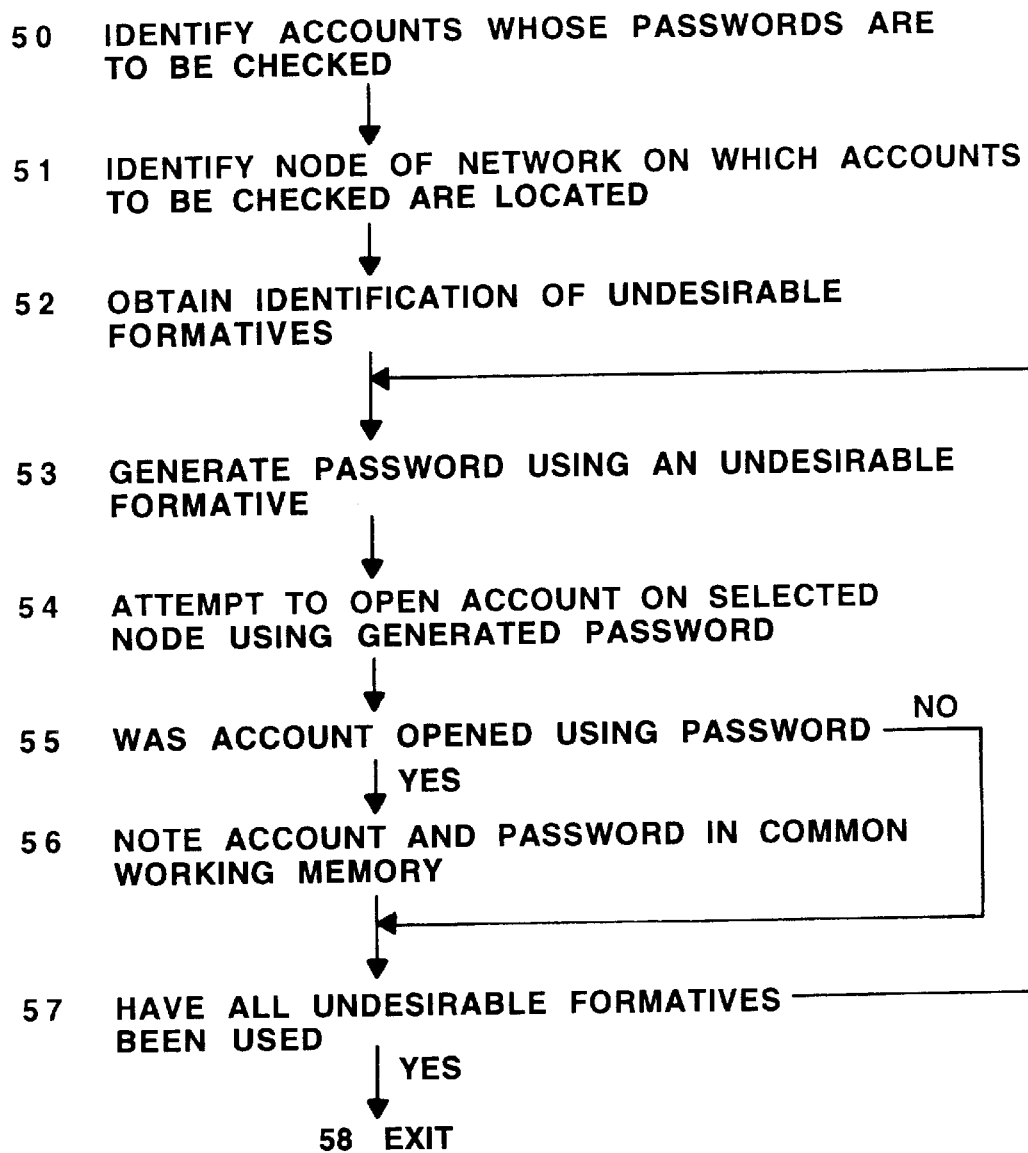
FIG. 3 is a flow diagram detailing the operation of a password inspector.

With reference to FIG. 3, when the password inspector 11 begins operating, it identifies the accounts whose passwords are to be checked (step 50). One specific embodiment of the password inspector 11 performs security check operations in connection with passwords for accounts specifically used to gain access to and control the operating system. In one specific computer system, those accounts are identified as an SYSTEM account, a FIELD account, and an SYSTEST system test account. The SYSTEM account is used by the system operator to install programs in the computer system and to maintain its daily operations and the FIELD and SYSTEST system test accounts are provided for use by maintenance personnel to maintain the computer system. In addition, the computer system may include several special purpose accounts for which it is desirable to restrict access, including an account used for backup of data stored in mass storage, an account used for emergency shutdown of the computer system, and an account used for programs for controlling message routing in the network.

After password inspector 11 has identified the accounts whose password protection is to be tested (step 50), the password inspector 11 identifies the node on which the accounts whose passwords are to be tested are located (step 51). If the computer system is a network of a plurality of nodes, each typically will have a network identifier or name, which is provided in step 51. In one embodiment, the operator provides a node name or identifier in step 51.

Following step 51, the password inspector 11 obtains the identification of formatives which should not be used as part of a password (step 52). A number of such formatives may be identified, as determined, in part, by the experience of the operator and others in determining formatives which may be easily guessed. Such formatives may include, for example, the node name or identification, the account name, the name of the user or a relative, the location of the user's home or business, the name or other identification of the company or work group, and identifying numbers such as a telephone number, Social Security number or badge number. This information may be maintained in the computer system or it may be provided by the operator.

After the password inspector 11 has obtained the undesirable password formatives (step 52), it sequences to step 53 in which it generates a test password using one or more of the undesirable formatives (step 53) and attempts to open the account on the identified node using the generated password (step 54). If the computer system is a networked system, in the operation in step 54, the password inspector 11 transmits, in a conventional manner, a request over the network to the node which would enable the identified node to open the account and make it available to the requesting node. If the computer system is a single system, that is not a networked system, the password inspector 11 transmits a request to the operating system to open the account. If the account is opened in response to the request, the password inspector 11 receives an affirmative response, and otherwise a negative response.

Following step 54, the password inspector 11 sequences to step 55 to test the response to the request to open the account using the password that was generated in step 53. If the password inspector 11 determines that the response to the request is affirmative, it stores the account and password, and the node name if the computer system is networked, in the common working memory 16 (step 56).

Following step 56, or following step 55 if the response to the request is negative, the password inspector 11 sequences to step 57 to determine if all of the undesirable formatives have been used, in all likely combinations, in the test operation. If not, the password inspector 11 returns to step 53 to generate another password using undesirable formatives and again attempt to open the account. After all undesirable formatives have been used in likely combinations, the password inspector 11 sequences to step 58 to exit.

B. Network Default Account Inspector 12

Figure 4A:
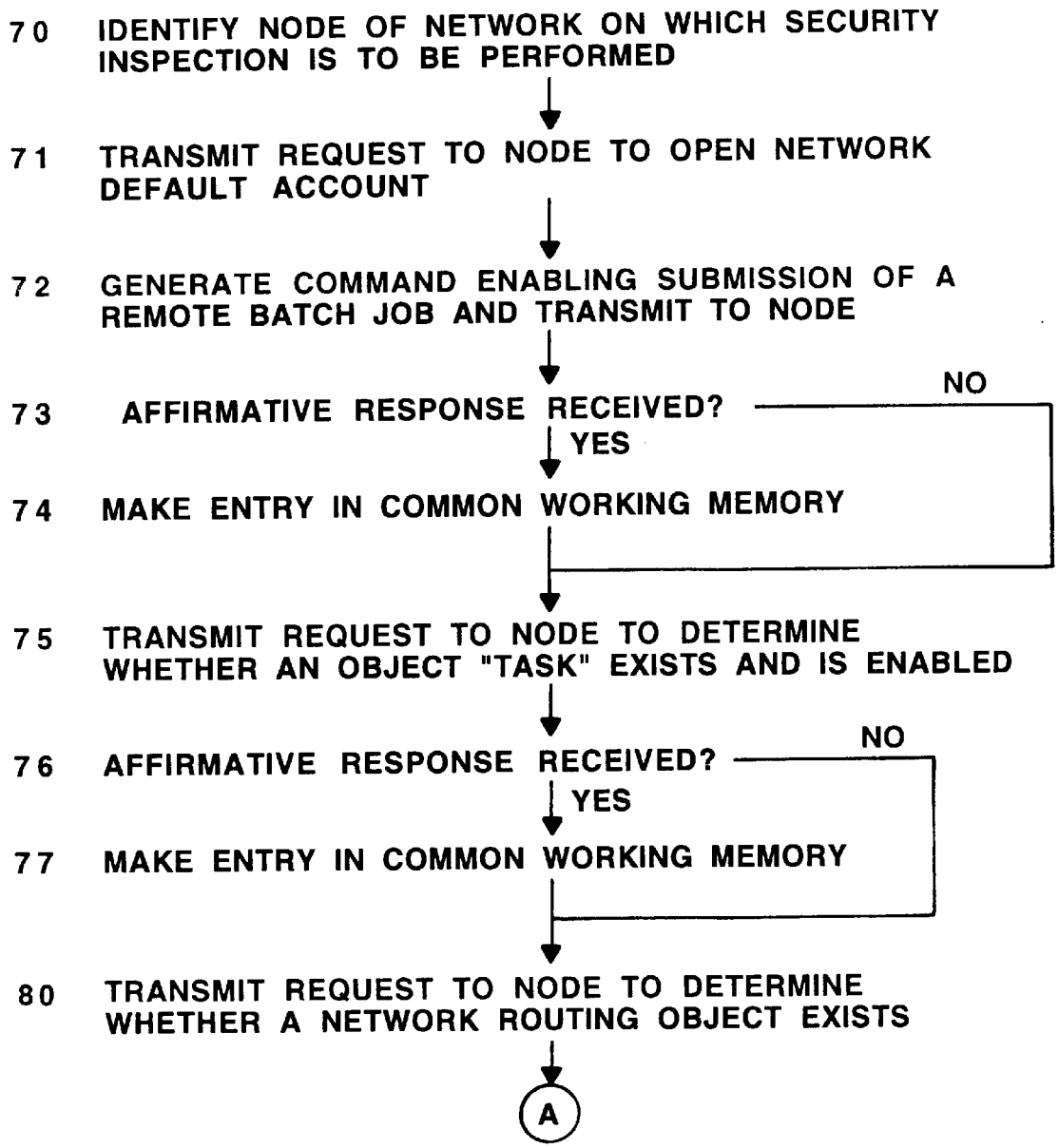
FIGS. 4A, 4B, and 4C are flow diagrams detailing the operations of a network default account inspector.
Figure 4B:
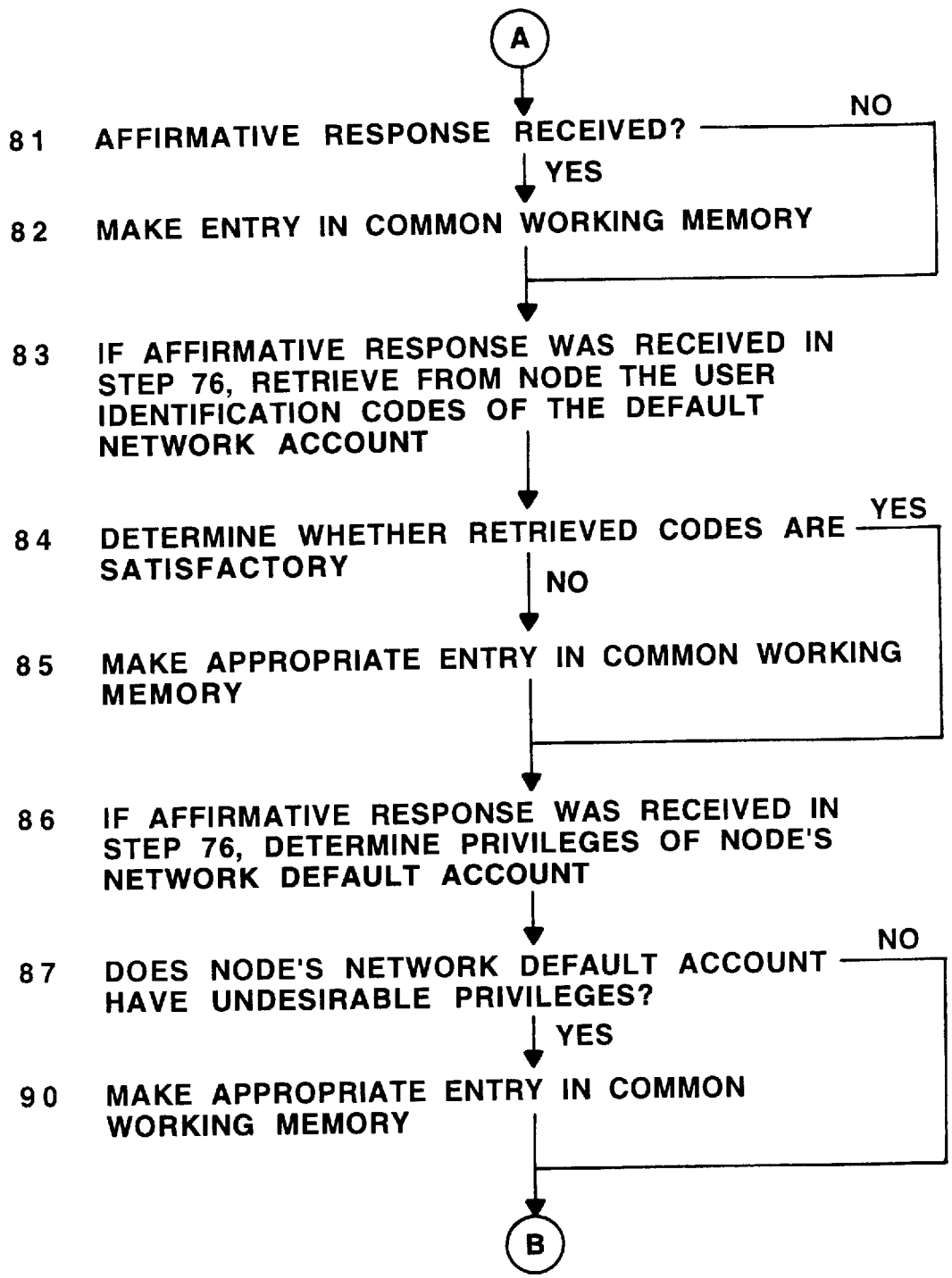
Figure 4C:
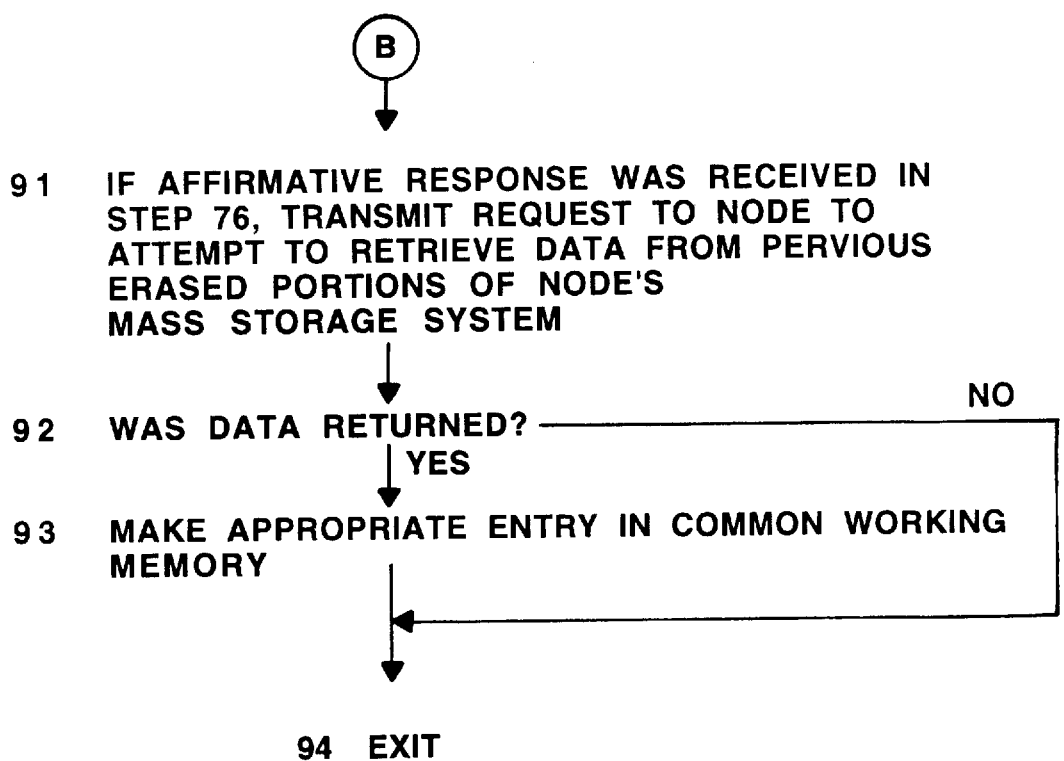

The network default account inspector 12 will be described in connection with FIGS. 4A through 4C, which detail the sequence of operations performed by the network default account inspector 12. Preliminarily, the network default account inspector 12, which is on one network node, performs a security inspection of the network default account on another node to address several security concerns relating to one specific networked computer system.

In one specific computer system including a plurality of nodes interconnected by a network, the network default account contains programs and files used to support communications over the network. The network default account permits access to the node from other nodes without requiring them to provide an account name and password. Accordingly, it is undesirable to provide the network default account to have privilege sufficient to permit it to access operating system files. The network default account inspector 12 inspects the network default account by checking the privileges accorded to the account.

A related problem may arise if a user on one node of the network can enable a remote node to execute a batch, that is, non-interactive, program, to be executed under the remote node's network default account. The network default account inspector 12 determines whether the remote node will execute a batch program under its network default account.

Another related problem may arise if the network default account has privileges normally reserved to a system operator or the operating system itself to, for example, establish or modify paging maps if the system uses virtual addresses, change device names, and so forth. If the network default account has privileges sufficient to enable users to access, execute or modify operating system files and programs, then a user on another node in the network may, by transmitting commands to the node under the network default account, perform such operations. Thus, it is desirable to ensure that the network default account does not have sufficient privilege to enable a user operating thereunder to direct access, execute or modify the operating system files.

In addition, each node in the network has several entities, or objects, which provide network services. One object, a TASK object, allows "task to task" communications between two programs. This communication may occur even if they are running under different operating systems and if they use different programming languages. A problem arises if the TASK object is part of, and can be run in, the network default account. If the TASK object can be run in the network default account, a user can run any program, including interactive programs, on a remote system without having to be in an authorized account on his system.

Another object is a ROUTING object which is used to facilitate message routing through the network if, for example, the network is divided into a plurality of local networks. In one specific embodiment, the network may comprise a plurality of local networks interconnected by network interfaces, which also comprise nodes on the network. When a node on one local network requires communications with a node on another local network, the communications is performed through one or more interfaces, and depending on the network topology, intermediate local networks. The ROUTING object permits the user to specify a path through nodes, generally the network interfaces, to effect communications over the network, and if the ROUTING object can be run on the intermediate nodes under their network default account, the identity of the user and originating node are disguised.

Finally, in one networked computer system, typically the nodes include a mass storage device such as a disk unit for storing files. In that computer system, it is possible for a user on one node to retrieve the contents of all, or at least portions, of files on a remote node which have been deleted by making requests under the remote node's network default account in conjunction with the TASK object.

With this background, the operations of the network default account inspector 12 will be described in connection with FIGS. 4A through 4C. With reference to FIG. 4A, the network default account inspector 12 first identifies the node on the network on which it is to perform a security inspection (step 70), which then will become a remote node for communications from the node being used by the operator to control the security inspection. The identification of the remote node may be provided by an operator, or, alternatively, if the network default account inspector 12 periodically inspects all of the nodes, the computer system may maintain a list of nodes and the identification of a node may be provided by the list.

After the remote node has been identified in step 70, the network default account inspector 12, in a conventional manner, generates and transmits to the node a request that it open its network default account (step 71). In one specific networked computer system, a user on one node may enable the opening of an account on a remote node by enabling his node to generate a command therefor along with a password which are transmitted over the network in a conventional manner.

After the network default account of the remote node has been opened, the network default account inspector 12 generates a command which would enable the remote node to accept and run a remote batch job, and transmits the command over the network to the remote node (step 72). It will be appreciated that, since the open account is the network default account, if the remote node at this point accepts the command, it is possible to run a batch job under the network default account, which, as noted above, is undesirable. Accordingly, if the remote node transmits, and the network default account inspector 12 receives, an affirmative response to the command (step 73), the network default account inspector 12 makes an appropriate entry in the common working memory 16 identifying the remote node and the security violation (step 74).

Following step 74, or step 73 if the network default account inspector 12 did not receive an affirmative response to the command requesting the remote node to accept and run a remote batch job, the network default account inspector 12 sequences to step 75. In step 75, the network default account inspector 12 generates and transmits a request to the remote node to determine whether the TASK object exists and is enabled. In one specific embodiment, the network default account inspector 12 is able determine whether an object exists and is enabled by transmitting a command therefor over the network. If an affirmative response is received, since the communications are under the network default account on the remote node, then the TASK object will exist and be enabled under the network default account, which, as described above, is undesirable.

After the network default account inspector 12 transmits the command in step 75 to determine whether the TASK object exists and is enabled in the network default account, the network default account inspector 12 waits for a response from the remote node (step 76). If the network default account inspector 12 receives an affirmative response in step 76, a security violation is indicated and it sequences to step 77 to make an appropriate entry in the common working memory 16. Following step 77, or step 76 if a negative response is received, the network default account inspector 12 sequences to step 80.

In step 80, the network default account inspector 12 generates and transmits to the remote node a command to enable it to determine whether the ROUTING object exists. As described above in connection with the TASK object, since the communications with the remote node are in the network default account, an affirmative response indicates that the ROUTING object exists in the network default account, which, as described above, is undesirable.

After the network default account inspector 12 transmits the command in step 80 to determine whether the ROUTING object exists in the network default account, the network default account inspector 12 waits for a response from the remote node (step 81). If the network default account inspector 12 receives an affirmative response in step 81, a security violation is indicated and it sequences to step 82 to make an appropriate entry in the common working memory 16. Following step 82, or step 81 if a negative response is received in that step, the network default account inspector 12 sequences to step 83.

Following step 82, the network default account inspector 12 makes several additional security check operations if and affirmative response was received in step 76 indicating that the TASK object exists and is enabled and accessible in the network default account. If an affirmative response was received in step 76, the network default account inspector 12 generates and transmits to the remote node a command which causes the remote node to return user identification codes associated with the network default account (step 83). The user identification codes identify users authorized to use the network default account. On receipt of a response message from the remote node containing the user identification codes, the network default account inspector 12 determines whether the codes are satisfactory (step 84) and if not makes an appropriate entry, indicating a security violation, in the common working memory 16 (step 85).

Following step 85, or step 84 if the retrieved user identification codes are satisfactory, and if an affirmative response was received in step 76, the network default account inspector 12 sequences to step 86, in which it generates and transmits to the remote node over the network a command message which enables the remote node to return identifications of the privileges possessed by the network default account. On receipt of a response message from the remote node containing codes identifying the network default account's privileges, the network default account inspector 12 determines whether any of the privileges are undesirable, that is, sufficient to allow a user under the network default account to access, execute or modify any of the operating system files (step 87). If so, the network default account inspector 12 makes an appropriate entry indicating the security violation in the common working memory 16 (step 90).

Following step 90, or step 87 if the privileges associated with the remote node's network default account are satisfactory, the network default account inspector 12 sequences to step 91. In step 91, if an affirmative response was received in step 76, indicating that the TASK object exists and is enabled in the network default account, the network default account inspector 12 generates and transmits to the remote node over the network a command which enables the remote node to attempt to retrieve data from previously erased portions of its mass storage system and return the retrieved data in the form of a message over the network to the network default account inspector 12. If the network default account inspector 12 receives data in response to the command (step 92) it makes an appropriate entry indicating the security violation in the common working memory 16 (step 93). Following step 93, or step 92 if no data was returned by the remote node, the network default account inspector 12 exits (step 94), having completed its security check operations.

C. System File Protection Inspector 13

The system file protection inspector 13 will be described in connection with FIG. 5. Preliminarily, file protection in one specific embodiment of a computer system permits the operator or user establishing the file to select access rights to the file for reading, writing, execution if the file contains a program, and deletion, with access being limited by whether the user wishing to access the file is (i) a system operator or operating system program being processed under the system operator, (ii) the owner or user that established the file, (iii) a group designation for the owner, so that others in a group associated with the owner may have the same access rights as the owner, and/or the world, or anyone who may use the system.

To identify the access rights of a file, each file contains an access rights vector of sixteen bits divided into four nibbles of four bits each. Each four bit nibble is associated with a user designation, and each bit in the nibble is associated with one of the four ways in which a file may be accessed, that is, one bit is associated with each of whether the file may be read, written, executed and deleted. Thus, if a file may be read, but not written, executed or deleted by the operating system, in the file's access rights vector in the nibble associated with the operating system the bit associated with reading the file is set and the bits associated with writing, executing and deleting the file are reset.

In that computer system, it is undesirable to permit at least some operating system files to be accessible by the "world", that is, by any user of the computer system. In one embodiment, these files are related, for example, to managing the operating system, providing operating system functions, maintaining maintenance and diagnostic functions, and so forth. And undesirable condition exists if any of these files can be accessed by any user of the computer system. Accordingly, the system file protection inspector 13 probes the files to retrieve their access rights vectors and determines whether their access rights designations are improper.

Figure 5:
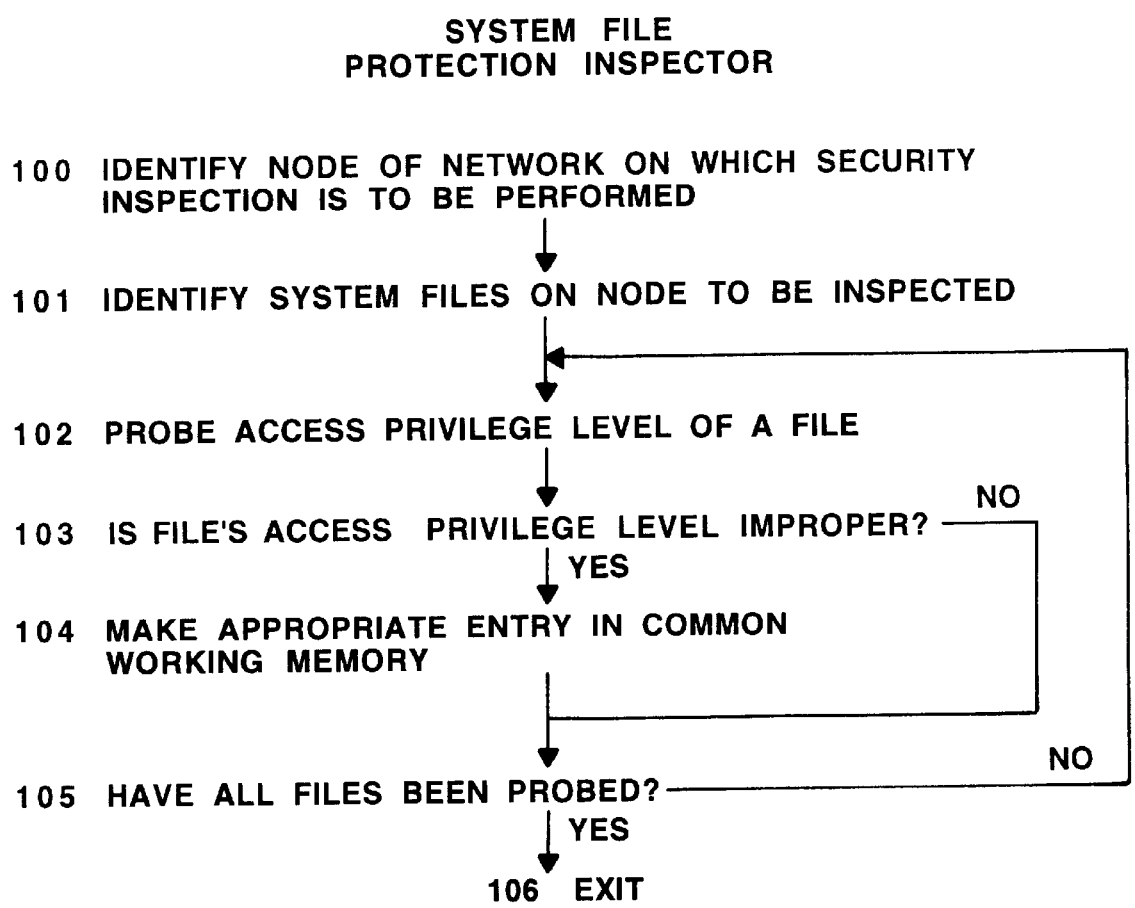
FIG. 5 is a flow diagram detailing the operations of a system file protection inspector.

Specifically, with reference to FIG. 5, if the computer system comprises a plurality of nodes interconnected by a network, the system file protection inspector 13 first identifies the node on which it is to perform a security inspection (step 100). As with the network default account inspector 12, the node may be identified by an operator, or alternatively by a node list if the nodes are periodically inspected automatically. After a node has been identified, the system file protection inspector 13 identifies the files on the node to be inspected (step 101). The identification of the files to be inspected may also be provided by an operator, by the remote node to be inspected, or if the files on each node is uniform may be included in or form part of the system file protection inspector 13.

After the system file protection inspector 13 has obtained the identification of the remote node and the files on which it is to perform a security inspection, it sequences to step 102. In step 102, the system file protection inspector 13 performs a probe operation, that is, it generates a message and transmits it to the remote node, the message including a command to enable the remote node to return the access rights vector of a file identified in the message. In response to the message, the remote node obtains the access rights vector of the identified file, generates a response message including the access rights vector and transmits the response message to the system file protection inspector 13.

After the system file protection inspector 13 has received the access rights vector of the file from the remote node, it determines whether the access rights associated with the file are satisfactory or improper (step 103). Specifically, the system file protection inspector 13 checks the nibble of the access rights vector associated with world accessibility, and if any of the bits in that nibble are set, determines that the file's access privilege level is improper. If, in step 103, the system file protection inspector 13 determines that the file's access privilege level is improper, it makes an appropriate entry in the common working memory 16 identifying the file and indicating the security violation (step 104). The system file protection inspector 13 then determines whether all of the files on the remote node have been probed, and if not, returns to step 102 to probe the next file. If all of the files on the remote node have been probed, the system file protection inspector 13 exits (step 106).

The system file protection inspector 13 as described above in connection with FIG. 5 operates in a networked computer system. It will be appreciated however, that the system file protection inspector 13 can also advantageously operate in a non-networked computer system. In that case, the system file protection inspector 13, instead of obtaining the access rights vector of the files by exchanging messages with a remote node, may obtain it directly from the single computer system and determine whether the vector indicates a security violation.

D. User Application Inspector 14

It will be appreciated that the previously-described security inspectors, namely password inspector 11, network default account inspector 12, and system file protection inspector 13, were all procedure-based, that is, the inspectors performed security inspections by iteratively checking for the existence of predetermined conditions indicative of security violations. In the user application inspector 14, on the other hand, several of the sub-inspectors, namely the captive account sub-inspector 21, network communication sub-inspector 22 and the specialists 25 and 26 in the application program sub-inspector 23 are rule-based, that is, the sub-inspectors, when enabled by the user inspector controller 20, determine whether a condition identified by a rule is violated and identifies the condition in the common working memory 16, whereas the log-in procedure sub-inspector 24 is procedure-based. The various sub-inspectors 21 through 24, including specialists 25 and 26, will be described in connection with FIGS. 6 through 10B.

(i) Captive Account Sub-Inspector 21

The captive account sub-inspector 21 will be described in connection with FIG. 6. Preliminarily, one specific computer system provides one type of account identified as a captive account, which, in turn, provides a restricted environment for running applications programs to minimize the effect of errors in the execution of applications programs on the rest of the computer system and, in turn, to minimize the effect of errors in other accounts to effect execution of the applications program. Thus, a captive account may, for example, be provided to allow users of limited skills to perform routine tasks while guarding against command entry errors. A captive account may also be provided for a batch operation which is to be run with little supervision, since an error in operation may otherwise adversely effect other operations of the computer system. In addition, a captive account may also be provided for programs, such as accounting or payroll programs, which must be protected from intrusion from other users in the computer system. The limitations of access to the computer system is accomplished by a specialized log-in command procedure used to obtain access to the captive account.

The restrictions of access to the captive account may be accomplished by providing restrictions in connection with log-in to the account and restrictions in connection with functions which may be performed by users in the account. The log-in restrictions may, for example, limit of access by various types of users to certain selected times. Thus, for example, a user on a local terminal may be able to access the captive account during certain hours, a second user on a network terminal may be able to access it during other hours and a third user may be able to process a batch program in the account during a third set of hours. The restrictions may be contained in the aforementioned user authorization file for the captive account.

Similarly, the functions which the captive account can perform are limited by settings of flags in the user authorization file for the account. Various flags in a user authorization file for an account are used to identify the account as a captive account and to prohibit use of a sequence of commands or control sequences which permit escape from the log-in operation or an applications program to the operating system. Other flags may be used to control such things as the delivery of certain system information or mail to the user and to control use of passwords. In addition, other flags may be used to control program execution by the applications programs under the account, in particular, the generation by applications programs of sub-processes.

As described above, the captive account sub-inspector 21 is rule-based, and FIG. 6 depicts structures of two rules. Part 6-1 of FIG. 6 depicts a rule in which, during its application, satisfaction of the rule's premises is indicative of a security violation, which is noted in the common working memory 16. Part 6-2, on the other hand, depicts a rule in which, satisfaction of the rule's premises is indicative of evidence of a potential security violation, which is also noted in the common working memory 16. In response to the indication of evidence in response to a rule application, the captive account sub-inspector 21, or alternatively the user inspector controller 20 after processing by the captive account sub-inspector 21, may perform further tests to determine whether a security violation is indicated. Alternatively, the captive account sub-inspector 21 may determine that a security violation exists, and record that in the common working memory 16, if it finds that the premises are satisfied of a predetermined number of rules which indicate evidence of potential security violations.

With reference to FIG. 6, and particularly to Part 6-1 of FIG. 6, a rule is depicted which determines that a security violation exists if the application program in an account requires a captive account and a captive account flag in the entry for the account in the user authorization file is not set. The reason for the security violation, as shown in Part 6-1, is that, if the captive account flag is not set, a user may access the supervisor level of the operating system by known keystroke control sequences.

During a security check operation, before the captive account sub-inspector 21 applies any rules, the operator first identifies to the captive account sub-inspector 21 an application program on which it is to perform a security inspection. In addition, the captive account sub-inspector 21 obtains from an operator an indication as to whether an application program requires, for example, a captive account. In response to a negative response, the rule depicted in FIG. 6-1 is not applied, since one of the premises, that is, the premise that the application requires a captive account, is not satisfied. On the other hand, in response to an affirmative response from the operator indicating that the application require a captive account, the captive account sub-inspector 21 determines whether the captive account flag is set in the application program's account. If the captive account flag is set, then the captive account sub-inspector 21 sequences to the next rule, but if the captive account flag is not set the captive account sub-inspector 21 stores a security violation indication in the common working memory 16 before sequencing to the next rule.

The captive account sub-inspector 21 performs similar operations in connection with the rule depicted in Part 6-2. In particular, the captive account sub-inspector 21 obtains from an operator an indication as to whether batch use of the application is to be disallowed. In response to a negative response, the rule depicted in FIG. 6-1 is not applied, since one of the premises, that is, the premise that the application disallows batch jobs, is not satisfied. On the other hand, in response to an affirmative response from the operator indicating that batch jobs are to be disallowed, the captive account sub-inspector 21 determines the condition of a batch flag in the application program's account. If the batch flag indicates that batch jobs are disallowed, the captive account sub-inspector 21 sequences to the next rule, but if the batch flag indicates that batch jobs are not disallowed, the captive account sub-inspector 21 stores an indication of evidence of a potential security violation in the common working memory 16 before sequencing to the next rule.

It will be appreciated that, although only two rules are depicted in FIG. 6, the captive account sub-inspector 21 may include similar rules for other restrictions as described above.

(ii) Network Communication Sub-Inspector 22

The network communication sub-inspector 22 will be described in connection with FIG. 7. As described above, the network communication sub-inspector 22 inspects network aspects of an applications program to identify two potential security violations, namely, whether the applications program transfers, that is, transmits or receives, information in plain text over a network which has been previously identified as being sensitive, and also whether the applications program transfers passwords or access control strings over the network. An access control string is a string which includes the user's name and password and is used to permit access to programs and information.

Two problems may arise if the applications program transfers sensitive information, which may include, for example, personnel, pay and accounting information, over the network in plain text. One problem is that another node on the network may intercept and use the information being transferred in plain text. In addition, another node inject messages containing false information which is then used by the applications program. Encryption techniques may be used to encrypt information so that it is not transferred in plain text. Similarly, if the applications program transfers access control strings over the network, another node may intercept them and access the programs and information protected thereby.

With this background, the network communication sub-inspector 22 will be described in connection with FIG. 7. Like the captive account sub-inspector 21, the network communication sub-inspector 22 is rule-based, and FIG. 7 depicts, in two Parts 7-1 and 7-2, structures of two rules. The rule depicted in Part 7-1 of FIG. 7 is applied to determine whether the applications program transfers data over the network in plain text, and the rule depicted in Part 7-2 is applied to determine whether the applications program transfers access control strings or passwords over the network.

More specifically, when initially starting the network communication sub-inspector 22 the operator identifies the applications program to be checked and indicates whether the information used by the applications program is sensitive. The network communication sub-inspector 22 searches through the code of the applications program to find code sequences which perform calls to the operating system to perform transfers over the network. When such a code sequence is located, the network communication sub-inspector 22 determines from the applications program whether the code sequence effects a transfer of information or an access control string.

If the code sequence effects a transfer of information, the network communication sub-inspector 22 applies the rule depicted in Part 7-1 of FIG. 7. The network communication sub-inspector 22 further searches through the code of the applications program to determine whether the data is transferred in plain text. If all of the premises of the rule are satisfied, that is, if the code sequence effects a transfer of information over the network, if the information is sensitive, and if the data is in plain text, that is, unencrypted, form, the premises of the rule depicted in Part 7-1 are satisfied. As a result, the rule concludes that a security violation exists and the network communication sub-inspector 22 inserts an indication of the security violation in the common working memory 16.

On the other hand, if the code sequence effects a transfer of an access control string, the network communication sub-inspector 22 applies the rule depicted in Part 7-2 of FIG. 7. Since the sole premise of the rule depicted in Part 7-2 requires a finding that the code sequence effects a transfer of an access control string, the rule concludes that a security violation exists and the network communication sub-inspector 22 inserts an indication of the security violation in the common working memory 16.

(iii) Application Program Sub-Inspector 23

As described above, the application program sub-inspector 23 uses two specialist security inspectors, namely, the executable image specialist 25 described in connection with FIG. 8 and the program code specialist 26 described in connection with FIG. 9. The application program sub-inspector 23 controls and coordinates application of the two specialists under control, in turn, of the user application inspector controller 20.

(a) Executable Image Specialist 25

The executable image specialist 25 will be described in connection with FIG. 8. As described above, the executable image specialist 25 examines the executable image, that is, the compiled, linked and executable applications program, to identify functions which could be used in such a way as to represent security violation conditions. One computer system provides a plurality of privilege levels arranged in a hierarchy to control access to the diverse functions which are provided by the operating system. With increasing levels, functions of increasingly critical importance to the operation of the computer system can be accessed.

It will be appreciated that functions of an application may be arranged in a hierarchy, with functions of increasing abstraction being in higher levels of the hierarchy. For example, an application may provide word processing capabilities using one of several different editor programs, each editor program being identified by name. At one level of abstraction, the function may be identified by the name of the editor program, and at a higher level of abstraction, the function may be identified by the group function identification "editor".

As described above, the executable image specialist 25 is rule-based. Based on the function hierarchy noted above, the executable image specialist provides several types of rules, each relating to a level in the function hierarchy. The rules are selected to identify combinations of conditions that may be present in the functions of the application, the running environment and requirements of an executable image which indicate security violation conditions. FIG. 8 depicts the structure of a typical rule in the executable image specialist 25. With reference to FIG. 8, the rule includes a premise, which has several parts.

With respect to the rule depicted in FIG. 8, one part (identified by "A" in FIG. 8) of the rule is satisfied if the installed or authorized privilege under the applications program represented by the executable image has a privilege level PRIV.VAL having a selected value. A second part (identified by "B" in FIG. 8) is satisfied if the applications program, as represented by the executable image, has a predetermined function FUNC.VAL. A third part (identified by "C" in FIG. 8) is satisfied if the applications program permits the user to have control over or may select, through the applications program, certain objects in the system, such as file names, directory names and so forth. If all of the rule's premises are satisfied, that is, if the executable image specialist 25 determines that all of parts A through C depicted in FIG. 8 are true, then the conclusion of the rule is that a security violation condition exists, and the executable image specialist 25 records the identification of the condition VIOL.VAL in the common working memory 16.

It will be appreciated that the particular premises and parts thereof which are used in particular rules to identify the existence of security violation conditions will depend upon the particular computer system in which the executable image specialist 25 is used. Generally, the premises may, for example, include the identification of a function or functions which can be performed or called by the executable image. In addition, the premise may identify the environment of the executable image, including the privilege level. Further, the premise may include the security requirements of the application, for example, whether the application is captive or otherwise controlled. The premise may also include reference to how the program is to be controlled.

The premises should be such as to identify conditions in which a user may, through an applications program, create, modify, or delete files which are important to the operation of the operating system. Thus, one embodiment includes a rule which identifies a security violation condition if (A) the installed or authorized privilege permits bypassing of the protection code vector regulating access to files, (B) the applications program permits a user to read a file, and (C) the applications program permits a file name to be specified by a user, or it uses a logical name which may be modified by the user. This condition results in the user having the ability to access any file including the system's user authorization file, which is undesirable. Other rules are also provided which protect the user authorization file from being deleted or modified by the applications program or by detached processes which the applications program may generate.

(b) Program Code Specialist 26

The program code specialist 26 will be described in connection with FIG. 9. As described above, the program code specialist 26 examines the source code of an applications program to determine whether relationships between control objects, which control the application program's access and resource availability, identified in the source code constitute a security violation condition. The program code specialist 26, like the executable image specialist 25, is rule based, with the rule premises identifying the control objects and relationships which are determined likely to constitute security violation conditions.

Figure 9:
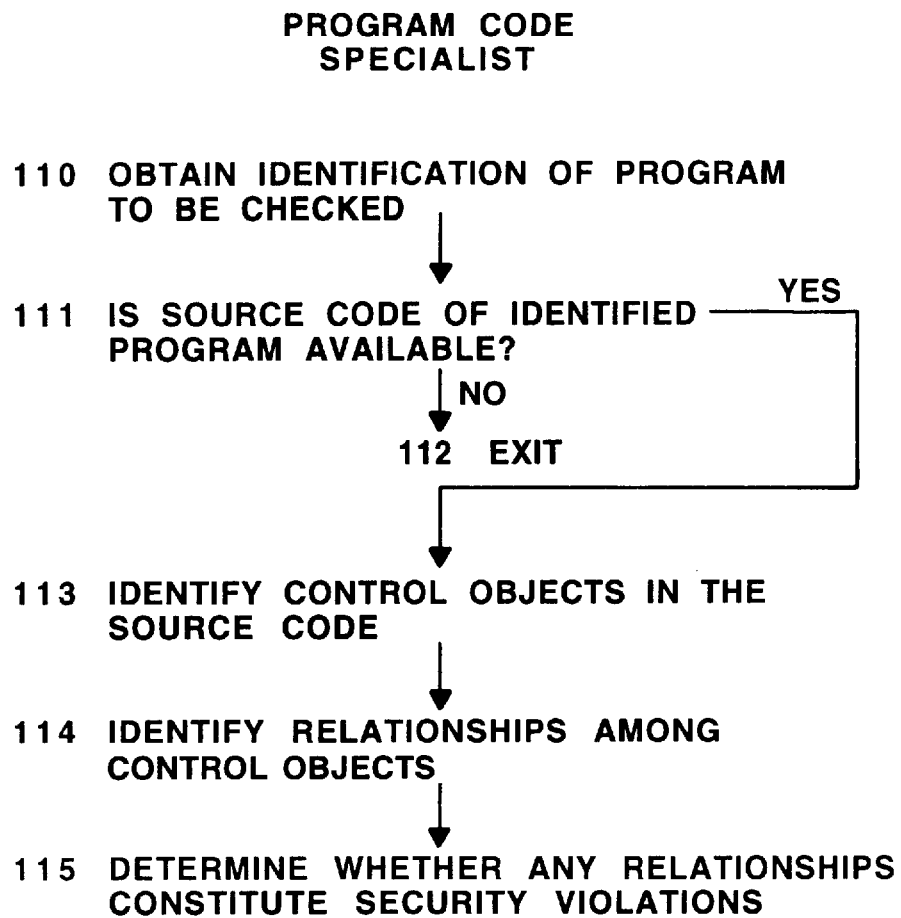
FIG. 9 is a flow diagram detailing the operations of a program code specialist.

FIG. 9 depicts a flow diagram illustrating the operations of the program code specialist 26. With reference to FIG. 9, the program code specialist 26 first obtains the identification of an application program (step 110) and determines whether the source code for the application program is available (step 111). If not, the program code specialist 26 exits (step 112), but if the source code is available, it performs a processing operation in connection with the source code to identify the control objects identified therein (step 113) and the relationships among the identified control objects (step 114). Thereafter (step 115) the program code specialist 26 processes the rules which it maintains to determine whether any security violation conditions exist, and, if so, records their identifications in the common working memory 16.

(iv) Log-In Procedure Sub-Inspector 24

The log-in procedure sub-inspector 24 will be described in connection with FIG. 10. Preliminarily, as is conventional, the computer system provides a log-in file which contains a series of log-in commands which are executed at the beginning of a user session. The log-in command procedure performs a number of functions, including definition of symbols, assignment of logical names, display of welcome, certain status and other messages, establishment of characteristics of the user's terminal, definition of terminal keys to perform certain predefined functions, and initiation of execution of an image of an applications program.

A number of security problems can arise in connection with the log-in procedure, primarily relating to the desirability of preventing users from escaping to the supervisor level of the operating system, which would permit access to applications and other information stored throughout the computer system. One problem is that, since the procedure is stored in a file, unless access to the file is limited to the system operator, thus excluding access by users, it may be possible for a user to modify the file so as to permit escape. In addition, unless the commands in the log-in procedure are suitably selected it may be possible for a user to escape to the supervisor level by conventional escape keystroke procedure, in the event of a system error detected during execution of the log-in procedure, or in the event of certain other abnormal conditions.

Figure 10A:
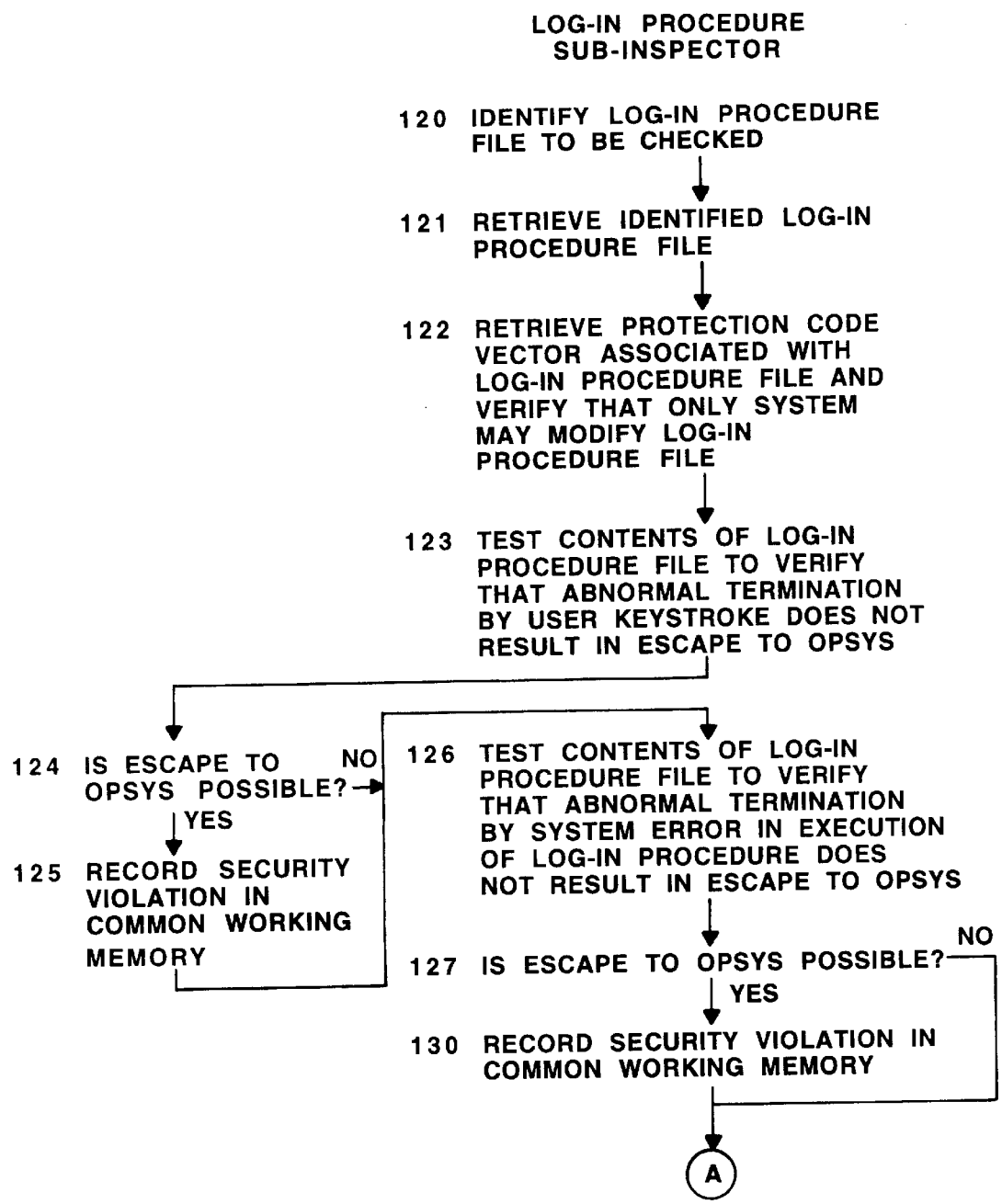
FIGS. 10A and 10B are flow diagrams detailing the operations of a log-in procedure sub-inspector.
Figure 10B:
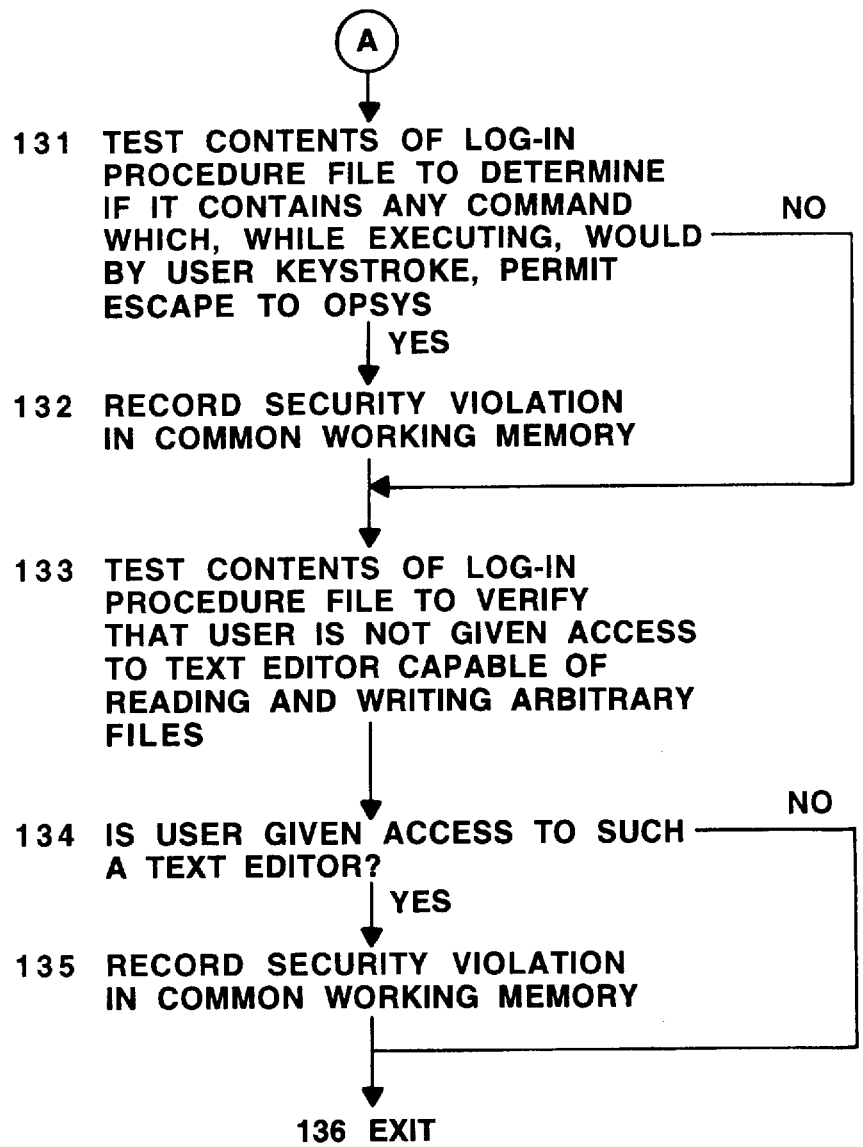

The log-in procedure sub-inspector 24 is procedure based and parses the commands in the log-in procedure file to detect a command which presents a security violation. The sequence of operations performed by log-in procedure sub-inspector 24 is depicted in FIGS. 10A and 10B. With reference to FIG. 10A, the log-in procedure sub-inspector 24 first obtains from the operator the identification of the log-in procedure on whose file it is to perform a security check operation (step 120), and retrieves the identified log-in procedure file (step 121). In addition, the log-in procedure sub-inspector 24 retrieves the protection code vector associated with the log-in procedure file from the user authorization file to verify that only the system operator may modify the log-in procedure file (step 122). If the protection code vector indicates that others than the system operator may modify the log-in procedure file, a security violation exists, which is recorded in the common working memory 16.

Following step 122, the log-in procedure sub-inspector 24 begins parsing the log-in procedure file for other security violations. The log-in procedure sub-inspector 24 sequences to step 123 to determine whether abnormal termination of the log-in procedure can be performed by entry by the user of an escape keystroke sequence. If such a termination can be performed, the user may be able to escape from the log-in procedure file to the supervisor level of the operating system. If escape to the supervisor can be performed by entry of an escape keystroke sequence (step 124), the log-in procedure sub-inspector 24 records existence of the security violation condition in the common working memory 16 (step 125).

Following step 125, or step 124 if escape to the supervisor cannot be performed by entry of an escape keystroke sequence, the log-in procedure sub-inspector 24 sequences to step 126, in which it checks the commands in the log-in procedure file to determine whether abnormal termination of the log-in procedure, by means of, for example, detection of a system error, will result in the escape to the supervisor level of the operating system. If so (step 127), the log-in procedure sub-inspector 24 records the existence of the security violation condition in the common working memory 16 (step 130).

Following step 130, or step 127 if escape to the supervisor cannot be accomplished in the event of detection of a system error, the log-in procedure sub-inspector 24 sequences to step 131, in which it checks the commands in the log-in procedure file to determine whether escape to the supervisor level of the operating system can be effected by entry of keystrokes by the user during execution of a command. If so, the log-in procedure sub-inspector 24 records the existence of a security violation condition in the common working memory 16 (step 132).

Following step 132, or step 131 if the log-in procedure sub-inspector 24 determines that escape to the supervisor level cannot be accomplished by entry of keystrokes by a user during execution of a command, the log-in procedure sub-inspector 24 sequences to step 133, in which it determines whether the log-in procedure file gives the user access to a text editor which would permit the user to read and write arbitrary files. Using such a text editor, the user could modify the log-in procedure file regardless of the condition of the protection code vector associated with the log-in procedure file. If the log-in procedure sub-inspector 24 determines that the log-in procedure file gives the user access to such a text editor (step 134), the log-in procedure sub-inspector 24 records the existence of a security violation condition in the common working memory 16. The log-in procedure sub-inspector 24 exits (step 136) following step 135, or step 134 if it determines in step 134 that the user is not given access to a text editor enabling him to read and write arbitrary files.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A program resident in a computer system having a common memory means for controlling a processor to identify security flaws in said computer system comprising:

a plurality of inspection modules, each one of said plurality of inspection modules adapted to enable said processor to perform a predetermined class of security check operations in said computer system to identify whether security flaws are present in said computer system, wherein each one of said plurality of inspection modules is further adapted to enable said processor to store indicia identifying located security flaws in said common memory means; and a control module adapted to enable said processor to control processing for each one of said plurality of inspection modules in response to a security test request from an operator and for performing a security evaluation operation in connection with indicia stored in said common memory means during processing of said inspection modules.

2. The program of claim 1 wherein said computer system includes a user application program, and said plurality of inspection modules includes an application inspection module for determining whether said user applications program has a predetermined security characteristic.

3. The program of claim 2 wherein said application inspection module includes a network communication inspection module for enabling said processor to identify predetermined security conditions with a user application program which performs communications over a network.

4. The program of claim 3 wherein said network communication inspection module enables said processor to determine whether a said user application program enables information to be transferred over said network in plain text.

5. The program of claim 3 wherein said network communication inspection module enables said processor to determine whether a said user application program transfers passwords over said network.

6. The program of claim 2 wherein said application inspection module includes an applications program inspection module for determining whether a said applications program permits said user to perform selected security violation operations.

7. The program of claim 6 wherein said applications program inspection module includes an executable image specialist module for enabling said processor to examine an executable image of said applications program to determine whether said applications program can perform certain operations which would permit said user to violate the security of the computer system.

8. The program of claim 6 wherein said applications program inspection module includes a program code specialist module for examining the source code of said applications program to determine whether said applications program can perform certain operations which would permit said user to perform selected security violation operations.

9. The program of claim 2 wherein
said computer system includes a user authorization file associated with a respective user applications program, and
a said application inspection module includes a captive account inspection module for enabling said processor to inspect information in a particular user authorization file associated with a particular applications program to determine that the associated user authorization file complies with predetermined security requirements of said particular applications program.

10. The system of claim 2 wherein
said computer system includes a plurality of operating levels, and
said application inspection module includes a log-in procedure inspection module for enabling said processor to determine whether a user may transfer control of the computer system level during log-in.

11. The system of claim 1 wherein a said plurality of inspection modules comprises a password inspection module for enabling said processor to detect whether a user who is authorized to use said computer system has selected a password which may be easily determined by an intruder.

12. The program of claim 11 wherein said password which may be easily determined by an intruder is a node name.

13. The program of claim 11 wherein said password which may be easily determined by an intruder is an account name.

14. The program of claim 11 wherein said password which may be easily determined by an intruder is a name of a company.

15. The program of claim 11 wherein said password which may be easily determined by an intruder is identifying numbers of users of said system.

16. The program of claim 1 wherein a said plurality of inspection modules includes a network default account inspection module for enabling said processor to determine if said computer system includes a plurality of interconnected nodes and whether a user can enable a remote node to execute an applications program while in a default account.

17. The program of claim 1 wherein;
said computer system includes system files each having an associated protection code, and
said plurality of inspection modules includes a system file protection inspection module for enabling said processor to determine whether each system file has a predetermined protection code level.

18. A method of checking the security of a computer system having a common memory which includes a plurality of storage locations for storing information, comprising:
performing a plurality of security flaw check operations by means resident within said computer system to identify whether security flaws are present;
storing indicia identifying located security flaws in said common memory;
controlling each of said plurality of security flaw check operations in response to a security flaw test request from an operator; and
performing a security evaluation operation in connection with said stored indicia.

19. The method of claim 18 further comprising
identifying possible security problems with a user application which performs communications over a network.

20. The method of claim 19 further comprising the step of
determining whether said applications programs permit said user to perform operations which violate the security of said computer system.

21. The method of claim 20 further comprising
examining an executable image of said applications program to determine whether said applications program can perform certain operations which would permit said user to violate the security of the computer system.

22. The method of claim 20 further comprising
examining the source code of said applications program to determine whether said applications program can perform certain operations which would permit said user to violate the security of said computer system.

23. The method of claim 19 further comprising determining whether said user application enables information to be transferred over said network in plain text; and
if so, identifying a security flaw.

24. The method of claim 19 further comprising determining whether said user application transfers passwords over said network; and
if so, identifying a security flaw.

25. The method of claim 19 further comprising determining whether a user may escape to an operating system level during log-in; and
if so, identifying a security flaw.

26. The method of claim 18 further comprising
detecting whether a user who is authorized to use said computer system has selected an easily predictable password.

27. The method of claim 18 further comprising
determining if said computer system includes a plurality of interconnected nodes and whether a user can execute a program of enable a remote node to execute an applications program while in a default account.

28. The method of claim 18 wherein
said common memory includes system files having protective codes, and further comprising
determining whether each system file has the proper protection code level.

29. The method of claim 18 further comprising
minimizing jeopardy to security in connection with user applications.

30. The method of claim 22 wherein said minimizing further includes
inspecting information in a user authorization file associated with a particular applications program, and
ensuring that said user authorization file complies with requirements of said particular applications program.

31. A security inspection system in a computer system comprising:
common memory means having a plurality of storage locations for storing information;
a plurality of inspection means operative within the computer system, each performing a predetermined class of security check operations in connection with said computer system, for identifying security flaws in said computer system, said plurality of inspection means storing, in said common memory means, indicia identifying located security flaws;

analyzing means for performing a security evaluation operation in connection with said indicia stored by said plurality of inspection means in said common memory means; and control means, resident within the computer system and connected to each one of said plurality of inspection means and said analyzing means, for controlling each one of said plurality of inspection means in response to a security test request from an operator.

32. The system of claim 31 wherein said computer system includes a user application program, and said plurality of inspection means includes an application inspection means for minimizing jeopardy to security in connection with said user applications program.

33. The system of claim 32 wherein said application inspection means includes a network communication inspection means for identifying predetermined security conditions with any user application programs which perform communications over a network.

34. The system of claim 33 wherein said network communication inspection means determines whether a said user application program enables information to be transferred over said network in plain text.

35. The system of claim 33 wherein said network communication inspection means determines whether a said user application program transfers passwords over said network.

36. The system of claim 32 wherein said application inspection means includes an applications program inspection means for determining whether said applications programs permit said user to perform operations which violate the security of said computer system.

37. The system of claim 36 wherein said applications program inspection means includes an executable image specialist means for examining an executable image of said applications program to determine whether said applications program can perform certain operations which would permit said user to violate the security of the computer system.

38. The system of claim 36 wherein said applications program inspection means includes a program code specialist means for examining the source code of said applications program to determine whether said applications program can perform certain operations which would permit said user to violate the security of said computer system.

39. The system of claim 32 wherein said computer system includes a user authorization file associated with a respective user applications program, and said application inspection means includes a captive account inspection means for inspecting information in a particular user authorization file associated with a particular applications program and ensuring that said user authorization file complies with requirements of said particular applications program.

40. The system of claim 32 wherein said computer system includes a plurality of operating levels, and said application inspection means includes a log-in procedure inspection means for determining whether a user may transfer control of the computer system level during log-in.

41. The system of claim 31 wherein at least one of said plurality of inspection means comprises a password inspection means for detecting whether a user who is authorized to use said computer system has selected a password which may be easily determined by an intruder.

42. The system of claim 41 wherein said password which may be easily determined by an intruder is a node name.

43. The system of claim 41 wherein said password which may be easily determined by an intruder is an account name.

44. The system of claim 41 wherein said password which may be easily determined by an intruder is a name of a company.

45. The system of claim 41 wherein said password which may be easily determined by an intruder is identifying numbers of users of said system.

46. The system of claim 31 wherein a said plurality of inspection means includes a network default account inspection means for determining whether said computer system includes a plurality of interconnected nodes and whether a user can execute a program to enable one of said plurality of interconnected nodes to execute an applications program while in a default account.

47. The system of claim 31 wherein said computer system includes a plurality of system files, each system file having an associated protection code, and wherein at least one of said plurality of inspection means includes a system file protection inspection means for determining whether each system file has the proper protection code level.

* * * * *